United States Patent [19]

Walter

[11] Patent Number: 4,684,489

[45] Date of Patent: Aug. 4, 1987

[54] PROCESS FOR MAKING A COMPOSITE WOOD PANEL

[75] Inventor: Karl Walter, Kempen, Fed. Rep. of Germany

[73] Assignee: G. Siempelkamp GmbH & Co., Krefeld, Fed. Rep. of Germany

[21] Appl. No.: 862,806

[22] Filed: May 13, 1986

[30] Foreign Application Priority Data

May 15, 1985 [DE] Fed. Rep. of Germany ....... 3517502

[51] Int. Cl.[4] ............................................ B29C 59/02

[52] U.S. Cl. .................................. 264/101; 264/120; 264/294; 264/547; 264/552

[58] Field of Search ................... 264/83, 82, 102, 109, 264/120, 101, 547, 552, 294; 156/62.2, 285, 296, 312

[56] References Cited

U.S. PATENT DOCUMENTS

| | | | |
|---|---|---|---|
| 3,280,237 | 10/1966 | Corbin et al. | 264/109 |
| 4,393,019 | 7/1983 | Geimer | 264/83 |
| 4,517,147 | 5/1985 | Taylor et al. | 264/83 |

FOREIGN PATENT DOCUMENTS 3430467 2/1986 Fed. Rep. of Germany .

*Primary Examiner*—Jan H. Silbaugh

*Assistant Examiner*—MaryLynn Fertig

*Attorney, Agent, or Firm*—Karl F. Ross; Herbert Dubno

[57] ABSTRACT

A process for making a composite wood panel, fiberboard or the like comprises putting a mat to be pressed between the press platens of a press, compressing the mat with heated press platens in a first compression step without feeding in steam until a density of at least 50% of that of the product panel is reached, preferably 70 to 85%, in a second compression step feeding steam with a pressure of between 1 to 3 bar through both press platens and compressing further until from 10 to 40% of the compression occuring in the first compression step (this is taken as 100%) is attained, in a third compression step interrupting the steam feed, the density attained in the second step being maintained, and subsequently compressing with a pressure of steam which is greater than the steam pressure used in the second compression step. Advantageously the steam pressing step is characterized by a flushing event in which the steam issues from the steam pressing orifices of one of the press platens and flows through the mat and also into the steam orifices of the other one of the press platens which temporarily are cut off from the source of the steam. Furthermore during a final compression time interval the mat is exposed to the action of a vacuum source connected to at least one of the press platens to dry the mat.

10 Claims, 4 Drawing Figures

PROCESS FOR MAKING A COMPOSITE WOOD PANEL

FIELD OF THE INVENTION

My present invention relates to a process for making a composite wood panel, i.e. particleboard, fiberboard, or the like, and more particularly to a process for making a composite wood panel from a mat composed of a wood chip, particle and/or fiber material and a curable or hardenable binder, for example a synthetic resin such as a urea-formaldehyde or like resin.

BACKGROUND OF THE INVENTION

A composite wood panel can be made by placing the mat to be pressed between the press platens of a press (see U.S. Pat. No. 4,517,147). The press platens are then brought together until they are in a compressing position during an initial compression time interval for compressing the mat. Then steam is fed in through steam orifices in both press platens on the mat during a steam pressing time interval.

The steam pressing step is characterized by a flushing interval in which steam issues from the steam orifices of one press platen and flows through the mat and also into the steam orifices of the other press platen which are temporarily cut off from the source of steam. Then the press platens travel into a final position defined by the mat thickness.

The steam input continues from the steam orifices of both platens for the balance of the steam pressing step during a final pressing of the mat.

Then during a final compression time interval the mat is exposed to the action of a vacuum source connected to at least one of the press platens and its steam orifices to dry the mat. A vacuum source can be connected to the steam-supply system instead of the steam generator.

A process of this type is also the subject of German Patent Document No. 34 30 467 and has proved satisfactory. It leads to composite wood panels of very uniform density over the entire panel cross section and also over the thickness of the panel. On the other hand different applications require composite wood panels with covering layers which have a density which is still greater than has been achieved with such earlier systems.

OBJECTS OF THE INVENTION

It is an object of my invention to provide an improved process for making a composite wood panel, i.e. fiberboard, particleboard, pressed board or the like.

It is also an object of my invention to provide an improved process for making a composite wood panel with covering layers having increased density.

SUMMARY OF THE INVENTION

These objects and others which will become more apparent hereinafter are attained in accordance with my invention in a process for making a composite wood panel comprising introducing the mat to be pressed between the press platens of a press.

The press platens are then brought together until they are in a compressing position during an initial compression time interval for compressing the mat.

Then steam is fed in through steam orifices in both press platens on the mat during a steam pressing step.

The steam pressing step is characterized by a flushing interval in which steam issues from the steam orifices of one press platen and flows through the mat and also into the steam orifices of the other press platen which is temporarily cut off from the source of steam.

The press platens then travel into a final position defined by the mat thickness. The steam feed continues from the steam orifices of both platens for the balance of the steam pressing step for the final pressing of the mat. After that, during a final compression time interval, the mat is exposed to the action of a vacuum source connected to at least one of the press platens and its steam orifices to dry the mat. A vacuum source can be connected to a system for feeding steam in place of the steam generator.

According to my invention the mat during precompression for a time interval of $t_0$–$t_1$ is compressed with heated press platens in a first precompression step in which at least 50%, advantageously 60% to 90% and preferably from 70% to 85%, of the final density $\rho_f$ of the product panel is attained, i.e. to a density $\rho_a$ of 0.6 $\rho_f$ to 0.9 $\rho_f$.

The mat is further compressed in a second compression step with the steam fed in from both of the press platens with a steam pressure of between 1 to 3 bar until a density $\rho_b$ of from 10 to 40% of the value of the density attained in the first compression step (that taken as 100%), has been reached, i.e. $\rho_b$=1.1 Pa to 1.4 $\rho_a$.

In a third compression step the feed of steam is interrupted, the density attained in the second compression step is maintained.

The compression is performed in a steam compression time interval $t_1$–$t_4$ with a steam pressure which is greater than the steam pressure of the second compression step and after that process steps $t_4$–$t_7$ subsequent to the steam compression time interval occur as will be described below, completing the press operation.

Preferably the second compression step is performed with a closing speed of the press platens of from 0.10 to 2 mm/sec. Also the density of the third compression step is maintained for 5 to 35 seconds, when a standard binder for particleboard and fiberboard is employed.

Surprisingly one finds that the fiberboard or the composite wood panel made by the process of my invention has covering layers with considerably greater density when one compresses the mat in several stages as described above, introduces the steam in an associated compression step with a reduced pressure and provides the holding time of the third compression step. Also one can perform additional processes as described above. My invention allows the composite wood panel to be formed with a density $\rho_f$ of 700 to 800 $kg/m_3$ in the interior and from 950 to 1050 $kg/m^3$ in the covering layers.

Advantageously during the steam compression time interval $t_1$–$t_4$ in which steam is fed in from both of the press platens, the steam is fed alternatingly first from one of the press platens and then to the other of the press platens. Also during a flushing interval $t_2$–$t_3$ of the steam compression time interval $t_1$–$t_4$ the steam feed can alternate between one press platen and the other press platen while the steam is removed through the steam orifices of the press platen not connected to the source of the steam.

BRIEF DESCRIPTION OF THE DRAWING

The above and other objects, features and advantages of my invention will become more readily apparent from the following description, reference being made to the accompanying drawing in which.

SPECIFIC DESCRIPTION

Figure 1:
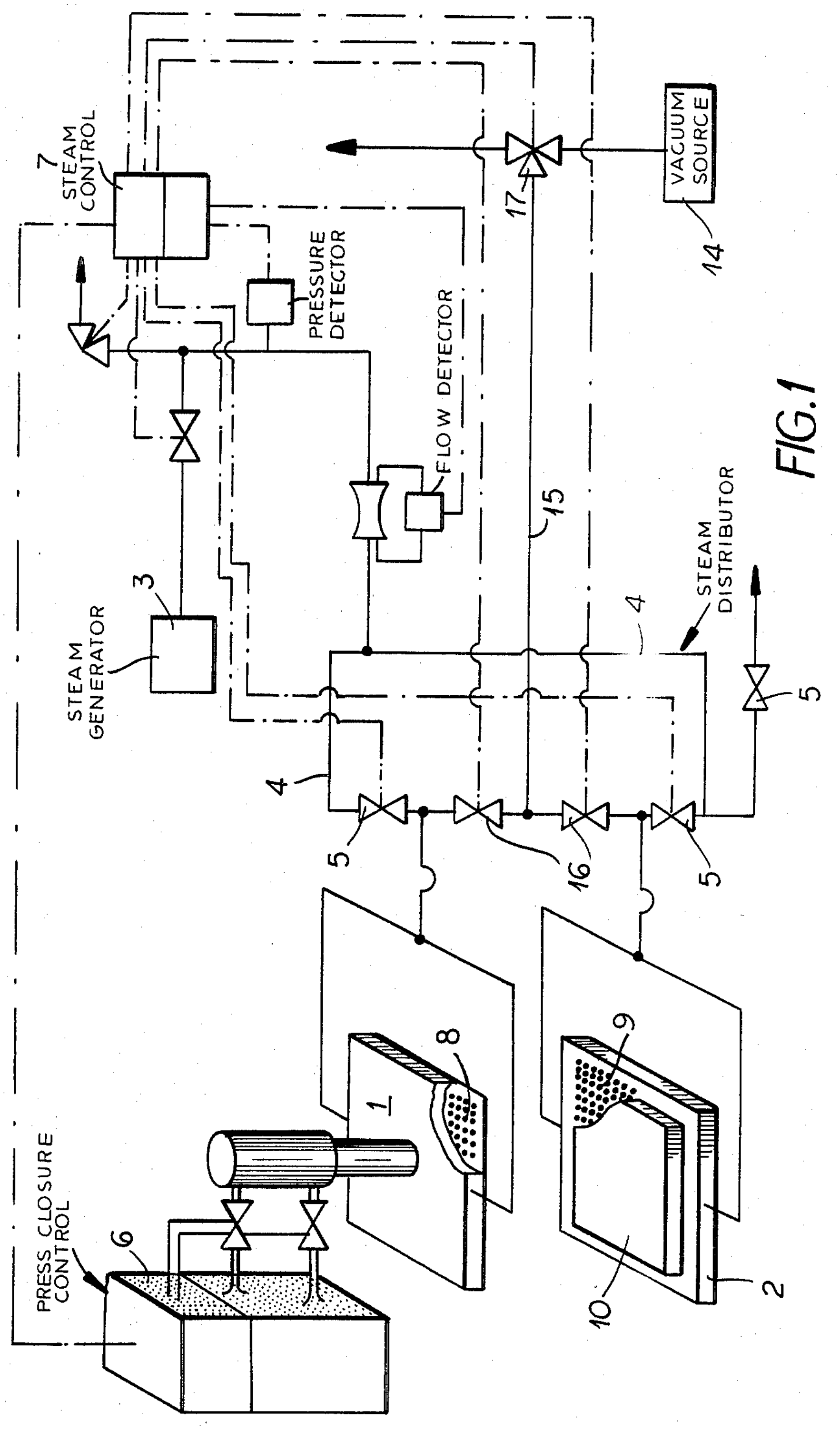
FIG. 1 is a schematic partially perspective view of a plant for manufacturing a composite wood panel according to the process of my invention (see also U.S. Pat. No. 4,517,137)
Figure 2:
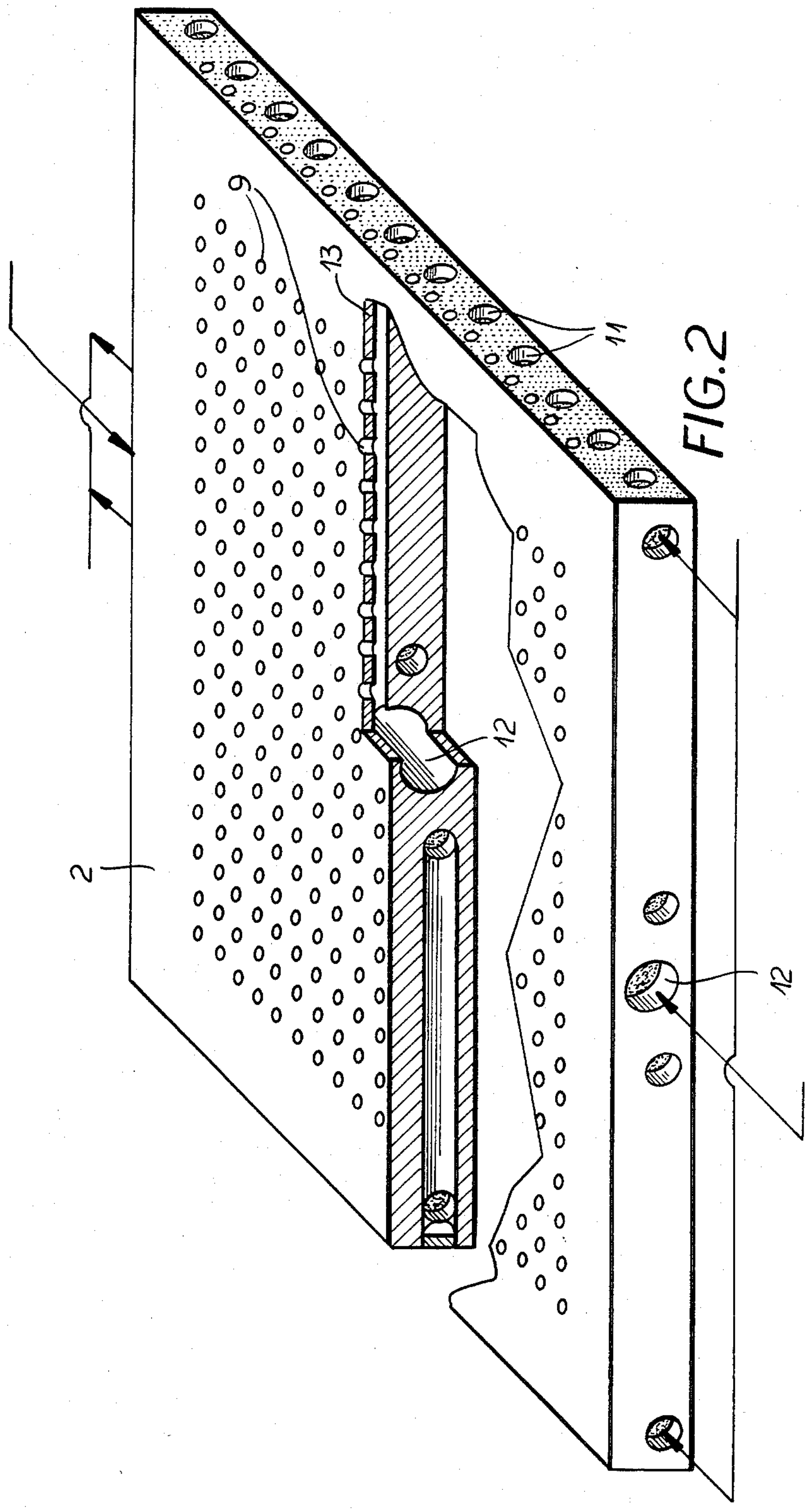
FIG. 2 is an enlarged partially cutaway perspective view of a press platen from the plant of FIG. 1.

The plant shown in FIGS. 1 and 2 comprises essentially a press having two steam press platens 1 and 2, a steam generator 3, a mechanism 4 for feeding steam to press platens 1 and 2 equipped with valves 5, a press platen control mechanism 6 for precise positioning of the press platens 1 and 2 during their closing motion in both initial compression and final compression steps, and a steam regulating mechanism 7 for injection of steam.

The press platens 1 and 2 have a plurality of steam orifices 8 and 9 distributed over their pressing surfaces facing the mat. These steam orifices 8 and 9 can be covered by a fine mesh screen of plastic or metal which has not been shown.

The mat is indicated in FIG. 1 with reference character 10.

The heating of the press platens 1 and 2 occurs particularly by heating ducts 11 which are indicated in FIG. 2. In this way the operating temperature of the press platens 1 and 2 is adjusted to a mean value, at which temperature the steam is supplied. The heating medium which flows through the heating ducts 11 can not flow out from the steam orifices 8 and 9. The steam which flows from the steam orifices 8 and 9 is fed into the platens 1 and 2 in a central duct 12 and flows from distributing ducts 13 connected transversely to the central duct 12 through the steam orifices 8 and 9.

Figure 3:
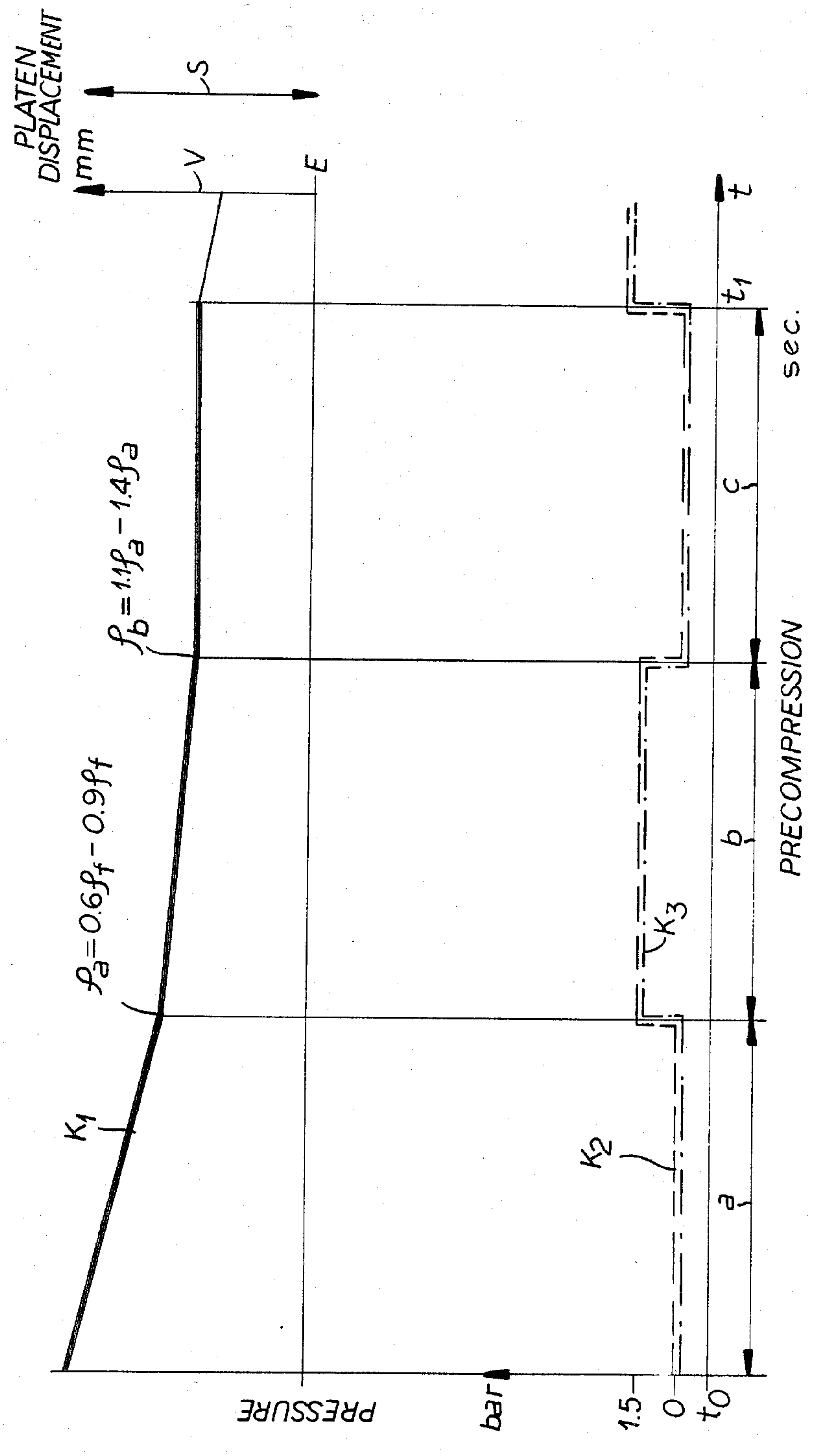
FIG. 3 is a graph showing the first steps of my process.

The graph of FIG. 3 shows how the precompression of the mat 10 occurs. On the abscissa the time t is plotted, on the ordinate the course of the precompression by the press platens 1 and 2 or the moving press platen 1 (as measured by the distance between the platens). The pressure of the injected steam is also shown on the ordinate (for the lower press platen as a dashed line-$K_2$, for the upper press platen as a dot-dashed line-$K_3$).

Whereas these curves $K_2$ and $K_3$ should actually lie on each other on account of coincident values they are shown displaced a little from each other for purposes of illustration.

FIG. 3 shows that the mat 10 is pressed by the press platens 1 and 2 in a first compression step a without steam injection until it reaches a predetemined density $\rho_a$. This amounts to at least 50%, for example 60 to 90% of the product panel or final density $\rho_f$. A good range for this step is 70% to 85%. In a second compression step b steam with a pressure of between 1 to 3 bar is injected by both press platens 1 and 2 and the compression proceeds to about 110 to 140% of the density achieved in the first compression step (where this is taken as 100%), i.e. to $\rho_b=1.1\ \rho_a$.

This value is so selected that one advantageously almost attains the final density $\rho_f$ of the product panel in the second compression step.

A third compression step c is subsequently effected. In this step the steam input is interrupted. The density attained in the second step b is maintained. The continuing compressing of the second compression step b occurs with a closing speed of the press platens 1 and 2 of from 0.1 to 2 mm/sec. In the third compression step c the density is maintained for 5 to 35 seconds.

Figure 4:
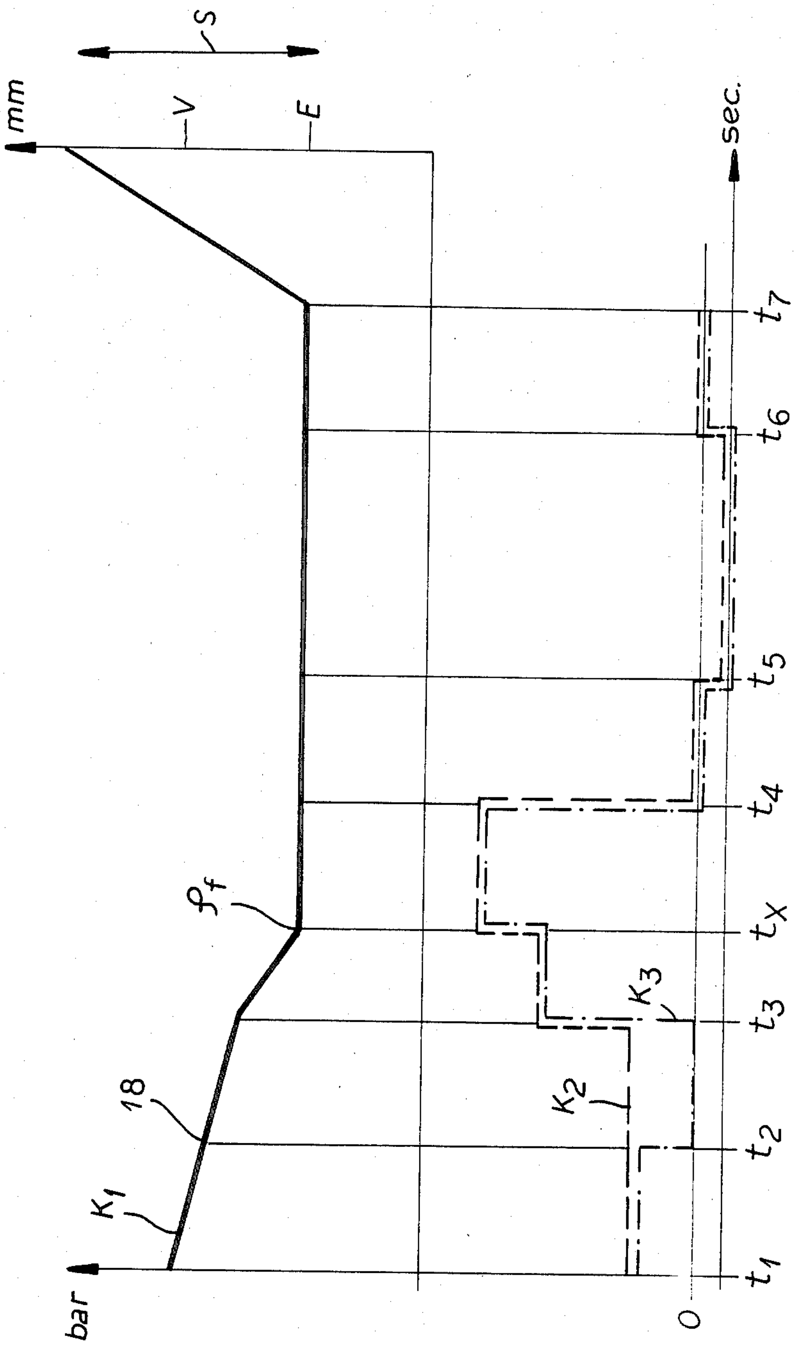
FIG. 4 is a graph showing the steps of the compression process subsequent to the steps of FIG. 3.

The steps of my process which occur after the precompression stage of FIG. 3 are shown in FIG. 4. In this graph the time in seconds is plotted on the abscissa. The left ordinate shows the steam pressure in bars, the right ordinate the spacing of the upper press platen 1 from the lower platen 2. The curve $K_1$ in FIG. 4 shows the spacing of the upper press platen 1 from the lower press platen 2 in millimeters.

The initial compression position is shown with at V. The dashed curve $K_2$ shows the steam pressure in the lower platen 2 in bar. The dot-dashed curve $K_3$ shows the steam pressure in the upper press platen 1. Where these curves would have coincided they are shown slightly displaced for purposes of illustration.

The null or zero line (steam pressure=0) is shown by a horizontal line labelled by 0 on the left ordinate. The mat 10 which is subjected to these process steps has been compressed as shown in FIG. 3.

Steam is injected into the mat for a steam injection time of $t_1$–$t_4$ through the steam orifices 8 and 9 of both vapor-press platens 1 and 2.

Further the press platens 1 and 2 travel together during a final compression time interval $t_3$–$t_x$ compressing the mat 10 into a final compression position E ($\rho_f$) defining the composite wood panel thickness.

The mat 10 is cured in this final compression position E of the press platen 1 without further steam injection during the compression time interval $t_5$–$t_6$.

From FIG. 4 one sees that the steam injection time interval $t_1$–$t_4$ is interrupted by a flushing time interval $t_2$–$t_3$, in which steam from the steam orifices 9 of press platen 2 flows through the compressed mat 10. Also steam from the steam orifices 8 of the other press platen 1 disconnected from the steam generator 3 is cut off.

After that the press platens 1 and 2 travel into their final compression position E and the steam feed to the mat 10 through the steam orifices 8 and 9 of both press platens 1 and 2 is continued for the rest of the steam injection time interval $t_1$–$t_4$. Then during the press time interval $t_5$–$t_6$ the mat 10 is exposed to the operation of a vacuum by both press platens 1 and 2 and their steam orifices 8 and 9 and is dried as a result. The system 4 for the feed of steam is connected to a vacuum source 14 instead of to the steam generator 3.

The steam injection time interval $t_1$–$t_4$ is broken up in this way by the flushing time interval $t_2$–$t_3$ into two intervals $t_1$–$t_2$ and $t_3$–$t_4$. The first interval $t_1$–$t_2$ of the steam injection time interval $t_1$–$t_4$ defines a time in which the compressed mat 10 is treated with steam. The steam input also occurs during the subsequent press time interval $t_3$–$t_x$ which is added to the second interval of the steam injection time interval $t_3$–$t_4$.

FIG. 4 shows the tendency of the section 18 of the curve $K_1$ to decrease. The press platens 1 and 2 are then brought slowly together during the time interval $t_1$–$t_2$ of the steam injection time interval $t_1$–$t_4$ and during the flushing time interval to maintain contact with the mat 10.

One can, however, keep the compression which is set in the compression process during the time interval $t_0$–$t_1$ constant in this interval so that the portion of the curve 18 runs substantially horizontally.

Before the mat 10 is exposed to vacuum a relaxation occurs and the mat 10 is closed to the surrounding air during a relaxation time interval $t_4$–$t_5$ by both press platens 1 and 2 and their steam orifices 8 and 9. The mat 10 in the final stages of compression is treated with steam during the rest of the steam injection time $t_3$–$t_4$ which has a higher pressure than the steam used in the intial stages of the compression.

In this embodiment condensible, for example slightly superheated steam, is used. As a result steam condenses during the first time interval $t_1$–$t_2$ of the steam injection interval $t_1$–$t_4$ and during the flushing press time interval $t_2$–$t_3$ in the mat 10, wherein the condensation adjusts the temperature very uniformly to a temperature of about 100° to 135° C. After that suitably noncondensable steam (i.e. more highly superheated steam) is used.

In order that the described steps can be performed without difficulty, particularly under computer control, the system 4 for feed of steam as shown in FIG. 1 has a conduit branch 15 which is connectable by the outflow valves 16 to both press platens 1 and 2.

The conduit branch 15 is connectable to a source of vacuum 14 during the final compression time interval $t_5$–$t_6$ for both steam press platens 1 and 2 and to the surrounding atmosphere during the relaxation time interval $t_4$–$t_5$ for both press platens 1 and 2 and during the flushing time interval $t_2$–$t_3$ for a steam press platen 1 by a conduit branch valve system 17.

The press platen control system 6 and the steam regulating system 7 are coupled. The steam regulating system 7 controls the vacuum treatment during the compression time interval of $t_5$–$t_6$, the relaxation during the relaxation press time interval of $t_4$–$t_5$ and the steam feed during the flushing time interval $t_2$–$t_3$.

The press platen control system 6 feeds control signals to the steam regulating system 7 at the end of the compression step a, on reaching the configuration V of the press platens 1 and 2 and on reaching the final position of the steam press platens 1 and 2.

The steam regulating system 7 causes the predetermined steam feed steps to occur during the compression step b of the first time interval $t_1$–$t_2$ of the steam compression time interval $t_1$–$t_4$ and during the balance $t_3$–$t_4$ of the steam injection or compression time interval $t_1$–$t_4$. Usually the press platen control system 6 and the steam regulating system 7 are controllable between the compression position V and the final compression position E according to a program.

The graphs of FIGS. 3 and 4 relate in detail to making especially composite wood panels with compressed surfaces from mats 10. For these mats 10 and thus for making of the 15 composite wood panels, as shown from FIG. 4, the steam injection or compression time interval $t_1$–$t_4$ is set up to a maximum of two thirds of the compression time t. The first time interval $t_1$–$t_2$ of the steam compression time interval $t_1$–$t_4$ amounts to less than 10 seconds until the flushing time interval $t_2$–$t_3$ begins, advantageously about 5 seconds. The balance of the steam compression or injection time $t_1$–$t_4$ is shorter than the difference of the steam injection time $t_1$–$t_4$ and the first injection time $t_1$–$t_2$ of the steam injection time $t_1$–$t_4$. That depends on the interruption of the steam injection time $t_1$–$t_4$ by the flushing time $t_2$–$t_3$ for a duration of under 5 seconds, preferably about 10 seconds. The final press time interval $t_3$–$t_x$ is computed as the balance of the steam injection or compression interval $t_3$–$t_4$.

Specific examples are given in the following Table I. The data in Table I relate to making a wood panel from the usual wood chip material and urea-formaldehyde resin. There is of course about 8 to 9% by weight moisture. The rough density amounts to about 0.390 g/cm³ (390 kg/m³). The values $P_1$, $P_2$, $P_3$ and $P_4$ give the spacing of the press platens from each other in millimeters; $Sp_1$, $Sp_2$, $Sp_3$ and $Sp_4$ give the steam pressure in bar. In the bottom portion of the table the time intervals in seconds are found. On the left end the final thickness of the manufactured panel is recorded.

During the steam injection interval steam is fed in by both press platens. However it is possible to alternate the input of steam from the first press platen 1 to the second press platen 2. That can also occur during the flushing time interval $t_2$–$t_3$. It guarantees that the steam is withdrawn by the other press platen so that it is pulled through the mat 10.

TABLE I

FIBERBOARD, CHIPBOARD
Urea-formaldehyde resin 8 to 9% relative to dry wood.
Moisture in rough dry mat about 8%. Dry rough density 390 kg/m3

| Final Density kg/m³ | $P_1$ | $P_2$ | $P_3$ | $P_4$ | $Sp_1$ | $Sp_2$ | $Sp_3$ | $Sp_4$ |
|---|---|---|---|---|---|---|---|---|
| 700 | 35.9 | 32.2 | 29.5 | 20. | 2.2 | 2.2 | 3.0 | 4.0 |
| 825 | 42.3 | 37.9 | 34.7 | 20. | 2.2 | 2.2 | 3.0 | 4.0 |

| Final Density kg/m³ | $t_1t_2$ | $t_2t_3$ | $t_3t_x$ | $t_xt_4$ | $t_4t_5$ | $t_5t_6$ | $t_6t_7$ |
|---|---|---|---|---|---|---|---|
| 700 | 3.2 | 4.8 | 2.25 | 8.0 | 3.0 | 5.0 | 5.0 |
| 825 | 3.8 | 5.7 | 3.5 | 9.4 | 3.0 | 5.9 | 5.0 |

EXAMPLE

The medium density fiberboard (MDF) of this example has a central density of 720 to 780 kg/m³ but a covering layer density of 950 to 1050 kg/m³. The mat 10 is introduced to the press with the heated press platens 1 and 2 for the purpose of the initial compression. It is compressed in a first compression step a to a density of from 550 to 680 kg/m³. During the second compression step b a further compression to 650 to 770 kg/m³ occurs with steam treament on both sides of the mat. Of course a steam pressure of 1.5 to 3 bar and a compression speed of 0.10 to 2 mm/sec is used. In the third compression step c these densities are maintained without steam input for 5 to 35 seconds so that the covering layers are stabilized. Now the steps occur according to FIG. 4, namely in the time interval $t_1$–$t_2$ a steam feed with an increased steam pressure of 2.5 to 4.0 bar for 3 to 10 seconds occurs with the density maintained in the third compression step c and set in the second compression process step b. That means increased steam pressure in contrast to the second compression process step b. During the flushing time interval $t_2$–$t_3$ a partial steam feed occurs with a steam pressure of 2.5 to 4 bar with a simultaneous suction of steam from the other side so that it can be pulled through the mat 10. This occurs for a time of about 3 to 10 seconds. Further compression to a final density and thickness under steam feed on both sides of the mat 10 with a steam pressure of 3 to 7 bar for 3 to 10 seconds occurs. During the time interval $t_4$–$t_5$–a release steam to the atmosphere occurs and subsequently during the time interval $t_5$–$t_6$ a vacuum suction occurs. A fiberboard panel with the density values given above results.

I claim:

1. In a process for making a composite wood panel, fiberboard or the like comprising putting a mat to be pressed between two press platens of a press, bringing said press platens together until they are in an initial compressing position during an initial compression time interval for compressing said mat, feeding steam through a plurality of steam orifices in both of said press platens to said mat during a subsequent steam pressing step, said steam pressing step being characterized by intermittant flushing events in which said steam issues from said steam pressing orifices of one of said press platens and flows through said mat and also into said steam orifices of the other one of said press platens which temporarily are out off from the source of said steam, further bringing said press platens into a final compression position defined by the thickness of the product panel, continuing by feeding in said steam from said steam orifices of both of said press platens for the balance of said steam pressing step for the final pressing of said mat, and during a final compression step said mat is exposed to the action of a vacuum source connected to at least one of said press platens to dry said mat, wherein said vacuum source can be connected to a system for feeding in said steam in place of said steam generator, the improvement wherein said mat during said initial compression time interval $t_0$–$t_1$ is first compressed with heated ones of said press platens in a first compression step in which at least 50% of the density of said product panel is attained, said mat is further compressed in a second one of said compression steps with said steam fed in from both of said press platens with a steam pressure of between 1 to 3 bar until a density of from 110 to 140% of the value of said density attained in said first compression step has been reached, and in a third one of said compression steps the feed of said steam is interrupted, said density attained in said second compression step being maintained and subsequently said steam pressing step is performed in a steam compression time interval $t_1$–$t_4$ with a pressure of said steam which is greater than said steam pressure of said second compression step.

2. The improvement according to claim 1 wherein said density of said product panel attained in said first compression step ranges from about 70% to 85%.

3. The improvement according to claim 1 wherein said compression in said second compression step is performed with a closing speed for said press platens of from 0.10 to 2 mm/sec.

4. The improvement according to claim 1 wherein in said third compression step said density is maintained for 5 to 35 seconds.

5. The improvement according to claim 1 wherein during said steam compression time interval $t_1$–$t_4$ in which said steam is fed in from both of said press platens said steam is fed alternatingly first from one of said press platens and then from the other of said press platens.

6. The improvement according to claim 1 wherein during a flushing time interval $t_2$–$t_3$ of said steam compression time interval $t_1$–$t_4$ said steam feed alternates between one of said press platens and the other of said press platens while said steam is removed through said steam orifices of said press platen not connected to said source of said steam.

7. A process for making a composite wood panel, fiberboard or the like comprising:

compressing a mat for a time interval of $t_0$–$t_1$ with heated platens of a press, wherein said compressing comprises first compressing without steam in a first compression step in which 70 to 85% of the density of the product panel is attained;

further compressing said mat in a second compression step with said steam fed in from both of said press platens with a steam pressure of between 1 to 3 bar until a density of from 110 to 140% of the value of said density attained in said first compression step has been reached with said platens closing at a speed of 0.10 to 2 mm/sec;

compressing said mat in a third compression step in which the feed of said steam is interrupted, said density attained in said second compression step being maintained for 5 to 35 seconds; and further compressing said mat in a steam compression time interval $t_1$–$t_4$ with a steam pressure which is greater than said steam pressure of said second compression step.

8. A process according to claim 7, further comprising a flushing event in which said steam issues from a plurality of steam orifices in one of said press platens and flows through said mat and also into a plurality of said steam orifices in the other one of said press platens which temporarily are cut off from the source of said steam, further bringing said press platens into a final compression position defined by the thickness of said product panel, continuing by feeding in said steam from said steam orifices of both of said press platens, and during a final compression step said mat is exposed to the action of a vacuum source connected to at least one of said press platens to dry said mat, wherein said vacuum source can be connected to a system for feeding in said steam in place of said steam source.

9. A method of operating a heated platen steam press for producing particle board from a mat of wood particles and a hardenable binder, comprising the steps of:

(a) prepressing said mat between heated platens of said press by ($a_1$) initially pressing the mat in a first prepressing stage devoid of steam treatment to a mat density $\rho_a = 0.6\ \rho_f$ to $0.9\ \rho_f$, where $\rho_f$ is the final density of said particle board, ($a_2$) in a second prepressing stage feeding steam to said mat through orifices in said platens at a pressure between 1 and 3 bar while compressing said mat between said platens to a density $\rho_b = 1.10\ \rho_a$ to $1.40\ \rho_a$, and ($a_3$) in a third prepressing stage interrupting the supply of steam through said platens while maintaining the mat at the density $\rho_b$ for a period of 5 to 35 seconds;

(b) advancing said platens toward one another to compress said mat to said density $\rho_f$ while feeding steam to said mat from said orifices in both of said platens for a balance of a required steaming period to form said board;

(c) interrupting the steaming of said mat in step (b) for a flushing interval in which steam is passed from the orifices in one of said platens through the thickness of said board and out thereform through the orifices in the other of said platens;

(d) thereafter terminating the supply of steam and evacuating the orifices of at least one of said platens to dry said board; and (e) spreading said platens apart and removing said board from between said platens.

10. The method defined in claim 9 wherein said platens are advanced toward one another in step ($a_2$) with a closing velocity of 0.1 to 2 mm/sec.

* * * * *